UNITED STATES PATENT OFFICE.

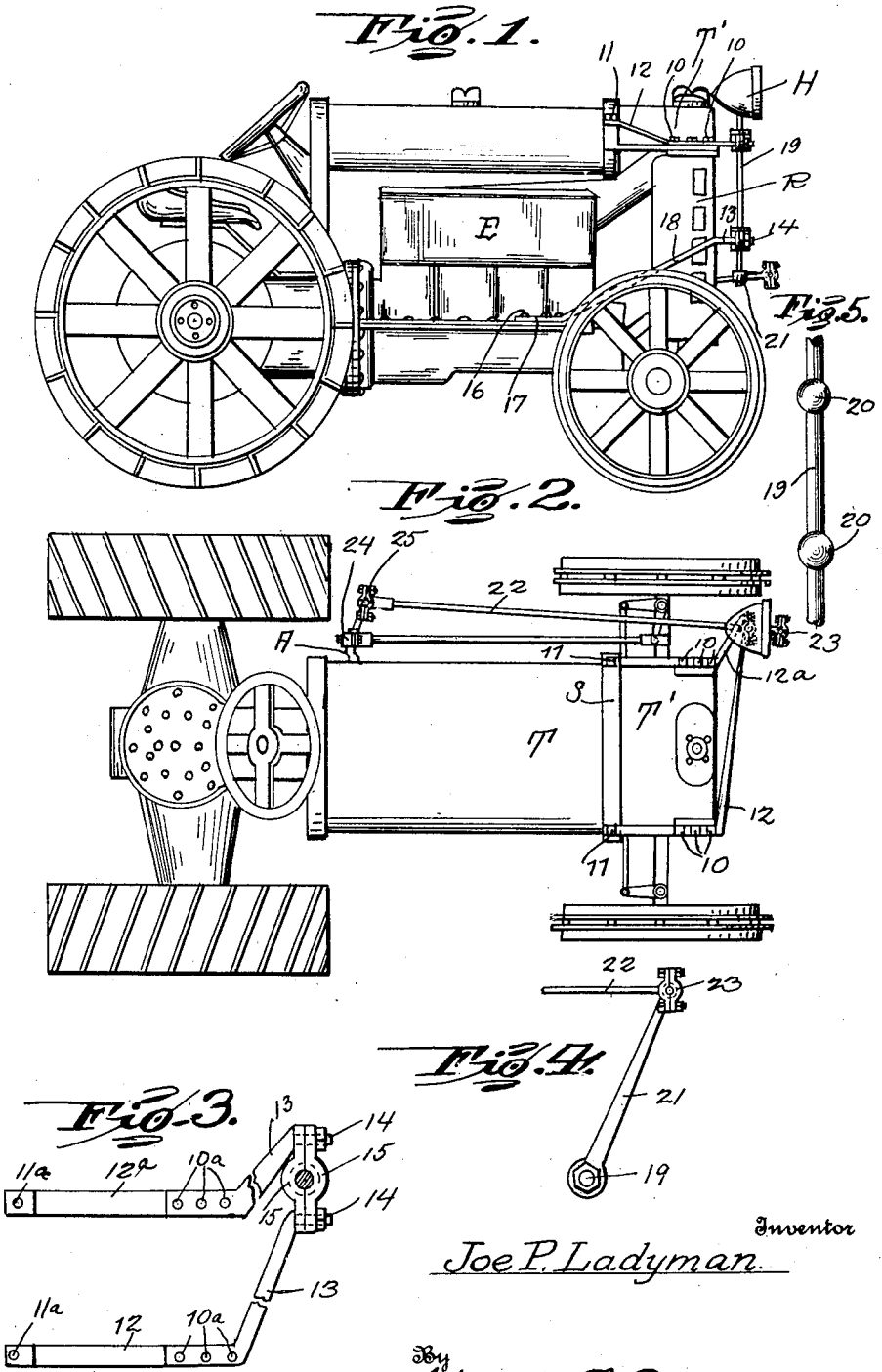

JOE P. LADYMAN, OF SHAWNEE, OKLAHOMA.

DIRIGIBLE HEADLIGHT.

1,404,303.    Specification of Letters Patent.    Patented Jan. 24, 1922.

Application filed May 14, 1921. Serial No. 469,505.

*To all whom it may concern:*

Be it known that I, JOE P. LADYMAN, a citizen of the United States, residing at Shawnee, in the county of Pottawatomie and State of Oklahoma, have invented certain new and useful Improvements in Dirigible Headlights, of which the following is a specification, reference being had to the accompanying drawings.

This invention relates to dirigible headlights, and more particularly to a dirigible headlight for tractors.

An important object of the invention is to provide a mounting for the headlight whereby the same will remain in substantially fixed relation with its control member to prevent twisting and distortion of the connections thereof. As is well known to those familiar with the art, the bodies of tractors are often subjected to unusual strains, often being employed upon very uneven ground, and where night plowing is done the amount of strain to which the tractor is subjected is increased due to the limited vision of the operator. In accordance with my invention, the headlight mounting is so arranged as to become substantially a rigid unit with respect to its drive, effectually preventing these strains being imparted thereto.

A further object of the invention is to provide a headlight mounting and control therefor which may be readily attached to the type of tractor at present known as Fordson, which may be attached to the tractor without in any manner altering the construction thereof and which employs as its means of attachment bolts normally used in the construction of the tractor.

Other objects and advantages of the invention will become apparent throughout the course of the following description.

In the accompanying drawings, wherein for the purpose of illustration is shown a preferred embodiment of my invention and wherein like reference characters designate like parts throughout:

Figure 1 is a side elevation of a tractor having a headlight mounting and control therefor constructed in accordance with my invention;

Figure 2 is a plan view thereof;

Figure 3 is a plan view of one of the pairs of brace members attached;

Figure 4 is a detail bottom plan view showing the manner of connecting the control arm; and Figure 5 is a fragmentary view of the headlight mounting shaft.

Referring now more particularly to the drawings, the character E designates the engine of the tractor, R the radiator thereof, T and T' the kerosene and gasoline tanks thereof, and S the strap securing these tanks together. The steering arm, by means of which the positioning of the tractor steering wheels is controlled, is designated by the character A. As is well known to those familiar with the art, in the Fordson tractor the steering arm A is as a rigid unit with the engine E, the mounting thereof being contained in the engine castings. The radiator R is likewise rigidly secured to the engine and the tanks T', as by means of bolts 10, and the tank T' is secured to the tank T by means of the strap S held in position by means of bolts 11.

In accordance with my invention, I provide bearing supports comprising arms 12 and 12$^a$, one disposed at each side of the upper surface of the tractor and each provided with openings 10$^a$ receiving the bolts 10 which secure the tank T' to the radiator R, and an opening 11$^a$ receiving the bolt of the strap S. These arms are provided at their forward ends with similarly directed angular portions 13 terminating at one side of the tractor and slightly forwardly thereof in spaced parallel portions 14 which are adapted to receive and maintain in position through medium of nuts carried thereby, the halves 15 of a ball and socket joint forming an upper bearing for the headlight shaft 19. By means of the engine bolts 16 securing the engine casting to the base, I secure at the opposite sides of the tractor other arms 17 having portions 18 solidly engaging against the sides of the radiator R to prevent side play of the arms. These arms are, similarly to the arms 12, provided with angular portions 13 terminating at their adjacent ends, and parallel portions 14 receiving the halves 15 of a ball and socket bearing, forming a lower bearing support for the shaft 19, which shaft has formed thereon upper and lower spherical enlargements 20 engaging in the bearings and has mounted upon the upper end thereof the headlight H. The lower end of the shaft 19 has secured thereto an operating arm 21 directed toward the center of the tractor which engages with a connecting link 22 through the medium of a ball and socket joint 23. To the steering arm A, I secure a clamp 24, the outer end of which connects with the rear end of the link 22 by means of a second ball and socket joint 25.

It will be seen that upon movement of the arm A to change the position of the steering wheels of the tractor, the light H will likewise be shifted, and an inspection of the connections of the arm A with the steering mechanism will reveal the fact that the light is turned in the same direction as the wheels, accordingly illuminating the path of the vehicle when turning corners.

From the foregoing it is believed to be obvious that I have constructed a dirigible headlight mounting for tractors which is particularly well adapted for the use for which it is intended by reason of the fact that it prevents twisting and distortion of the connections of the headlight with the operating mechanism. It will furthermore be obvious that many changes are possible in the shape, size and arrangement of the various parts hereinbefore set forth without in any manner departing from the spirit of my invention, and I accordingly do not limit myself to the specific structure hereinbefore set forth except as hereinafter claimed.

What I claim is:

The combination with a tractor embodying an engine, radiator therefor, and fuel storage tank bolted to the radiator, rigidly connected together and a steering arm mounted for oscillation upon the engine, of a vertical headlight supporting shaft disposed forwardly and to one side of the radiator and formed with spaced ball portions, a pair of arms secured to said tractor by the bolts connecting said radiator and tank, a second pair of arms secured to said tractor by the base bolts of said engine and embodying portions engaging against the sides of each radiator, converging portions formed on each of said arms terminating in parallel sections, bearings mounted on said parallel portions and receiving the ball portions of said shaft whereby to permit rotation and prevent longitudinal movement thereof, an arm secured to said shaft, a link, a ball and socket connection between said arm and one end of link, a second arm secured to said steering arm and a ball and socket connection between said second arm and the other end of said link.

In testimony whereof I hereunto affix my signature.

JOE P. LADYMAN.